United States Patent
Wang et al.

(10) Patent No.: US 7,805,551 B2
(45) Date of Patent: Sep. 28, 2010

(54) MULTI-FUNCTION QUEUE TO SUPPORT DATA OFFLOAD, PROTOCOL TRANSLATION AND PASS-THROUGH FIFO

(75) Inventors: Chi-Lie Wang, Milpitas, CA (US); Jason Z. Mo, Fremont, CA (US); Mario Au, Fremont, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 384 days.

(21) Appl. No.: 11/863,184

(22) Filed: Sep. 27, 2007

(65) Prior Publication Data

US 2009/0086748 A1    Apr. 2, 2009

(51) Int. Cl.
G06F 3/00 (2006.01)
H04L 12/54 (2006.01)
(52) U.S. Cl. ........................................ 710/52; 370/413
(58) Field of Classification Search ............. 710/52–57, 710/310; 370/412–419
See application file for complete search history.

(56) References Cited

U.S. PATENT DOCUMENTS

| | | | |
|---|---|---|---|
| 4,298,954 A * | 11/1981 | Bigelow et al. ............... 710/53 |
| 4,335,277 A | 6/1982 | Puri | |
| 5,224,213 A * | 6/1993 | Dieffenderfer et al. ........ 710/53 |
| 5,257,384 A | 10/1993 | Farrand et al. | |
| 5,717,883 A | 2/1998 | Sager | |
| 6,047,339 A * | 4/2000 | Su et al. ........................ 710/56 |
| 6,271,866 B1 | 8/2001 | Hancock | |
| 6,816,929 B2 * | 11/2004 | Ueda ........................... 710/56 |
| 2004/0225779 A1 | 11/2004 | Zhou et al. | |
| 2005/0283598 A1 | 12/2005 | Gaskins et al. | |
| 2008/0205422 A1 | 8/2008 | Wang et al. | |

* cited by examiner

*Primary Examiner*—Christopher B Shin
(74) *Attorney, Agent, or Firm*—Bever, Hoffman & Harms, LLP

(57) ABSTRACT

A multi-port serial buffer having a plurality of queues is configured to include a first set of queues assigned to store write data associated with a first port, and a second set of queues assigned to store write data associated with a second port. The available queues are user-assignable to either the first set or the second set. Write operations to the first set of queues can be performed in parallel with write operations to the second programmable set of queues. In addition, a first predetermined set of queues is assigned to the first port for read operations, and a second predetermined set of queues is assigned to the second port for read operations. Data can be read from the first predetermined set of queues to the first port at the same time that data is read from the second predetermined set of queues to the second port.

23 Claims, 6 Drawing Sheets

MULTI-FUNCTION QUEUE TO SUPPORT DATA OFFLOAD, PROTOCOL TRANSLATION AND PASS-THROUGH FIFO

RELATED APPLICATIONS

The present application is related to the following commonly-owned, co-filed U.S. patent applications:

U.S. patent application Ser. No. 11/863,176 entitled "SERIAL BUFFER SUPPORTING VIRTUAL QUEUE TO PHYSICAL MEMORY MAPPING", by Chi-Lie Wang, Calvin Nguyen and Mario Au.

U.S. patent application Ser. No. 11/863,192 entitled "ADAPTIVE INTERRUPT ON SERIAL RAPIDIO (SRIO) ENDPOINT", by Chi-Lie Wang, Jason Z. Mo and Bertan Tezcan.

U.S. patent application Ser. No. 11/863,199 entitled "NON-RANDOM ACCESS RAPID I/O END-POINT IN A MULTI-PROCESSOR SYSTEM", by Chi-Lie Wang, Jason Z. Mo, Stanley Hronik and Jakob Saxtorph.

FIELD OF THE INVENTION

The present invention relates to a multi-port serial buffer designed to operate as a serial RapidIO (sRIO) end-point to provide data offload, protocol translation and pass-through FIFO functions.

RELATED ART

It is desirable for a serial buffer to be able to efficiently and flexibly store and retrieve packet data. One method for improving the flexibility of a serial buffer is to provide more than one port for the serial buffer. It would be desirable to have a method and system for improving the flexibility and efficiency of memory accesses in a serial buffer having multiple ports.

SUMMARY

Accordingly, the present invention provides a multi-port serial buffer that enables the flexible assignment of queues among the ports. A first programmable set of queues may be assigned to store write data in response to write requests received on a first port, and a second programmable set of queues may be assigned to store write data in response to write requests received on a second port. The first and second programmable sets of queues are selected in response to programmable configuration bits provided on the serial buffer. Thus, any queue can be assigned to implement write accesses received by either the first port or the second port.

In addition, a first predetermined set of queues is assigned to the first port for read operations, and a second predetermined set of queues is assigned to the second port for read operations. Packet data can be read out of the first predetermined set of queues to the first port at the same time that packet data is read out of the second predetermined set of queues to the second port.

In accordance with one embodiment, each of the queues has a corresponding destination ID register that stores a destination identification value associated with the queue. If the destination identification field of an incoming packet header matches a destination identification value stored in a destination ID register, a write operation is enabled to the associated queue. Multiple queues can be assigned the same destination identification value, which will allow the incoming packet data to be simultaneously written into multiple queues. Because multiple queues can be simultaneously written, system performance can be improved and bus bandwidth utilization can be optimized.

In accordance with another embodiment, each of the queues also has a corresponding source ID register that stores a source identification value associated with the queue. If the destination identification field of an incoming priority packet matches a source identification value stored in a source ID register, a slave read operation is enabled to the associated queue.

Because each of the queues has both a destination ID register and a source ID register, packet write operations can be performed in parallel with packet read operations within each of the queues.

In accordance with one embodiment, write operations to each queue are associated with the same port as read operations from the same queue, such that the serial buffer can be used as a data offload device.

In another embodiment, write operations to each queue are associated with a different port than read operations from the same queue. If the different ports are running the same protocol (i.e., sRIO or Lite), then the serial buffer can function as a data offload device or a pass-through FIFO. If the different ports are running different protocols, then the serial buffer can be used as a protocol translator.

The present invention will be more fully understood in view of the following description and drawings.

DETAILED DESCRIPTION

Figure 1:
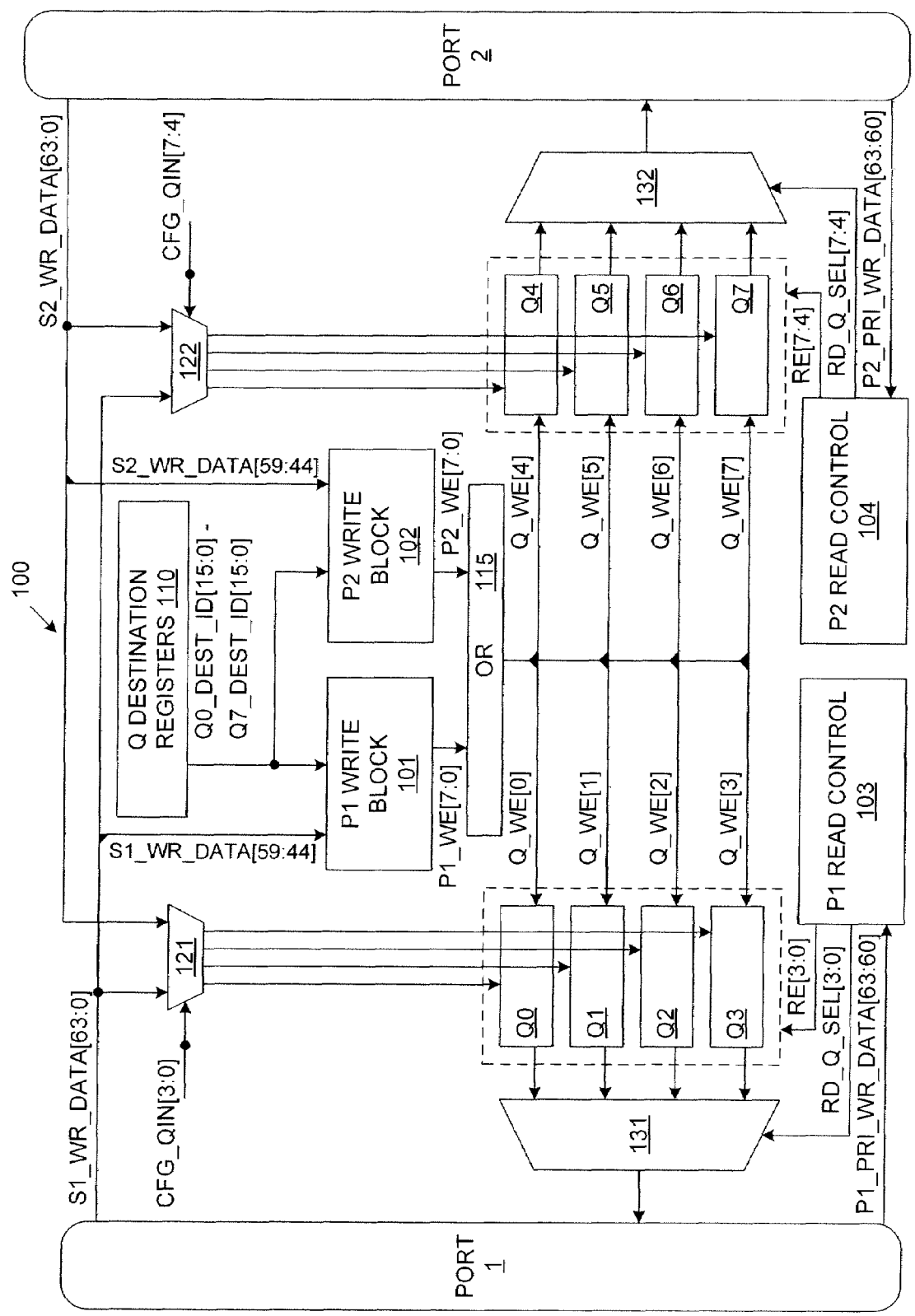
FIG. 1 is a block diagram of a serial buffer in accordance with one embodiment of the present invention.

FIG. 1 is a block diagram of a serial buffer 100 in accordance with one embodiment of the present invention. Serial buffer 100 includes a first port 1, a second port 2, memory queues Q0-Q7, first port write block 101, second port write block 102, first port read block 103, second port read block 104, queue destination identification registers 110, logical OR circuit 115, write data multiplexers 121-122, first port read data multiplexer 131 and second port read data multiplexer 132.

In the described embodiments, first port 1 of serial buffer 100 may be configured with either an sRIO protocol or a Lite-weight protocol. Similarly, second port 2 of serial buffer 100 may be configured with either an sRIO protocol or a Lite-weight protocol, thereby providing great flexibility in configuring ports 1 and 2. In an alternate embodiment, first port 1 of serial buffer may be configured only with an sRIO protocol. In general, a port configured with an sRIO protocol may function as an sRIO end-point, while a port configured with a Lite-weight protocol is configured to operate with a field programmable device. Ports 1 and 2 can be configured with other protocols in other embodiments. In addition, other numbers of ports can be implemented by serial buffer 100 in other embodiments.

In general, write requests associated with the first port 1 can be performed to a first programmable set of queues Q0-Q7, and write requests associated with the second port can be performed to a second programmable set of queues Q0-Q7, wherein the first programmable set of queues Q0-Q7 and the second programmable set of queues Q0-Q7 are mutually exclusive. As will become apparent in view of the following description, each of the queues Q0-Q7 can be assigned to either the first programmable set (i.e., assigned to the first port 1 for write operations) or the second programmable set (i.e., assigned to the second port 2 for write operations). Write requests associated with the first port can be processed in parallel with write requests associated with the second port.

In general, read requests associated with the first port 1 are processed by accessing queues Q0-Q3, and read requests associated with the second port 2 are processed by accessing queues Q7-Q4. Read requests associated with the first port 1 can be processed in parallel with read requests associated with the second port 2.

In addition, read and write operations can be performed in parallel within any of the dual-port queues Q0-Q7.

These queue configurations for read and write requests great flexibility in operating serial buffer 100. For example, queues Q0-Q3 may be assigned to store write data associated with write requests to the first port 1, and queues Q7-Q4 may be assigned to store write data associated with write requests to the second port 2. In this configuration, write operations to each queue are associated with the same port as read operations from the same queue, such that each port of the serial buffer 100 can be used as a data offload device.

In another example, queues Q0-Q3 may be assigned to store write data associated with write requests to the second port 2, and queues Q7-Q4 may be assigned to store write data associated with write requests to the first port 1. In this configuration, write operations to each queue are associated with a different port than read operations from the same queue. If the first port 1 and the second port 2 are running the same protocol (i.e., sRIO or Lite), then serial buffer 100 can function as a data offload device or a pass-through FIFO. That is, data written to queues Q0-Q3 from the second port 2 is read from queues Q0-Q3 to the first port 1 (and data written to queues Q7-Q4 from the first port 1 is read from queues Q7-Q4 to the second port 2). If the first port 1 and the second port 2 are running different protocols in this example, then the serial buffer 100 will operate as a protocol translator.

Many other queue configurations are possible in view of the present disclosure, and these configurations are considered to fall within the scope of the present invention.

Write operations to queues Q0-Q7 will now be described in detail. The user initially specifies the values of write configuration bits CFG_QIN[7:0], which are used to route the write data received from the first port 1 and the second port 2 to the desired queues. That is, write configuration bits CFG_QIN [7:0] are used to specify a correspondence between ports 1 and 2 and queues Q0-Q7 for write operations. More specifically, write configuration bits CFG_QIN[7:0] specify which of the queues Q0-Q7 can be written in response to write requests associated with first port 1, and which of the queues Q0-Q7 can be written in response to write requests associated with second port 2. In the described examples, if a write configuration bit CFG_QIN[n] has a logic '0' state, then write requests associated with the first port 1 are performed to the corresponding queue, Qn (wherein 'n' is any integer from 0 to 7, inclusive). Conversely, if a write configuration bit CFG_QIN[n] has a logic '1' state, then write requests associated with the second port 2 are performed to corresponding queue, Qn. For example, write configuration bits CFG_QIN[7:0] having a value of '0001 1100' would indicate that write requests associated with the first port 1 can be performed to queues Q7, Q6, Q5, Q1 and Q0, while write requests associated with the second port 2 can be performed to queues Q4, Q3 and Q2.

Write data multiplexer 121 is configured to selectively route write packet data from the first port 1 or the second port 2 to queues Q3-Q0 in response to write configuration bits CFG_QIN[3:0], respectively. Similarly, write data multiplexer 122 is configured to selectively route write packet data from the first port 1 or the second port 2 to queues Q7-Q4 in response to write configuration bits CFG_QIN[7:4], respectively. If a write configuration bit CFG_QIN[n] has a logic '0' value, then the write packet data from the first port 1 is routed to the corresponding queue, Qn. Conversely, if a write configuration bit CFG_QIN[n] has a logic '1' bit, then the write packet data from the second port 2 is routed to the corresponding queue, Qn. In this manner, write packet data from either the first port 1 or the second port 2 can be selectively provided to any one of queues Q0-Q7.

Each write request includes a write packet header and corresponding write packet data. Write requests on the first port 1 are specified by 64-bit double-words, which are labeled as first port write request signals S1_WR_DATA[63:0] in FIG. 1. Similarly, write requests on the second port 2 are specified by 64-bit double-words, which are labeled as second port write request signals S2_WR_DATA[63:0] in FIG. 1. Control signals (not shown) indicate whether each 64-bit double-word represents a write packet header or write packet data.

In the described embodiment, when the first port write request signals S1_WR_DATA[63:0] represent a write packet header, bit locations S1_WR_DATA[59:44] represent a 16-bit destination identification field that includes a destination identification (ID) value of the associated first port write request. Similarly, when the second port write request signals S2_WR_DATA[63:0] represent a write packet header, the bits S2_WR_DATA[59:44] form a destination identification field that includes a destination ID value of the associated second port write request. As described in more detail below, these destination ID values are used to generate write enable signals Q_WE[7:0] to enable write operations within queues Q7-Q0. The first port destination ID value S1_WR_DATA[59:44] and the second port destination ID value S2_WR_DATA[59:44] are provided to the first port write block 101 and the second port write block 102, respectively.

Queue destination registers 110 store destination ID values associated with queues Q0-Q7. In the described embodiments, queue destination registers 110 store eight 16-bit destination ID values. More specifically, queue destination identification registers 110 store destination ID values Q0_DEST_ID[15:0], Q1_DEST_ID[15:0], Q2_DEST_ID[15:0], Q3_DEST_ID[15:0], Q4_DEST_ID[15:0], Q5_DEST_ID[15:0], Q6_DEST_ID[15:0], and Q7_DEST_ID[15:0], which correspond with queues Q0, Q1, Q2, Q3, Q4, Q5, Q6 and Q7, respectively. The destination ID values Q0_DEST_ID[15:0] to Q7_DEST_ID[15:0] are provided to both the first port write block 101 and the second port write block 102.

Figure 2:
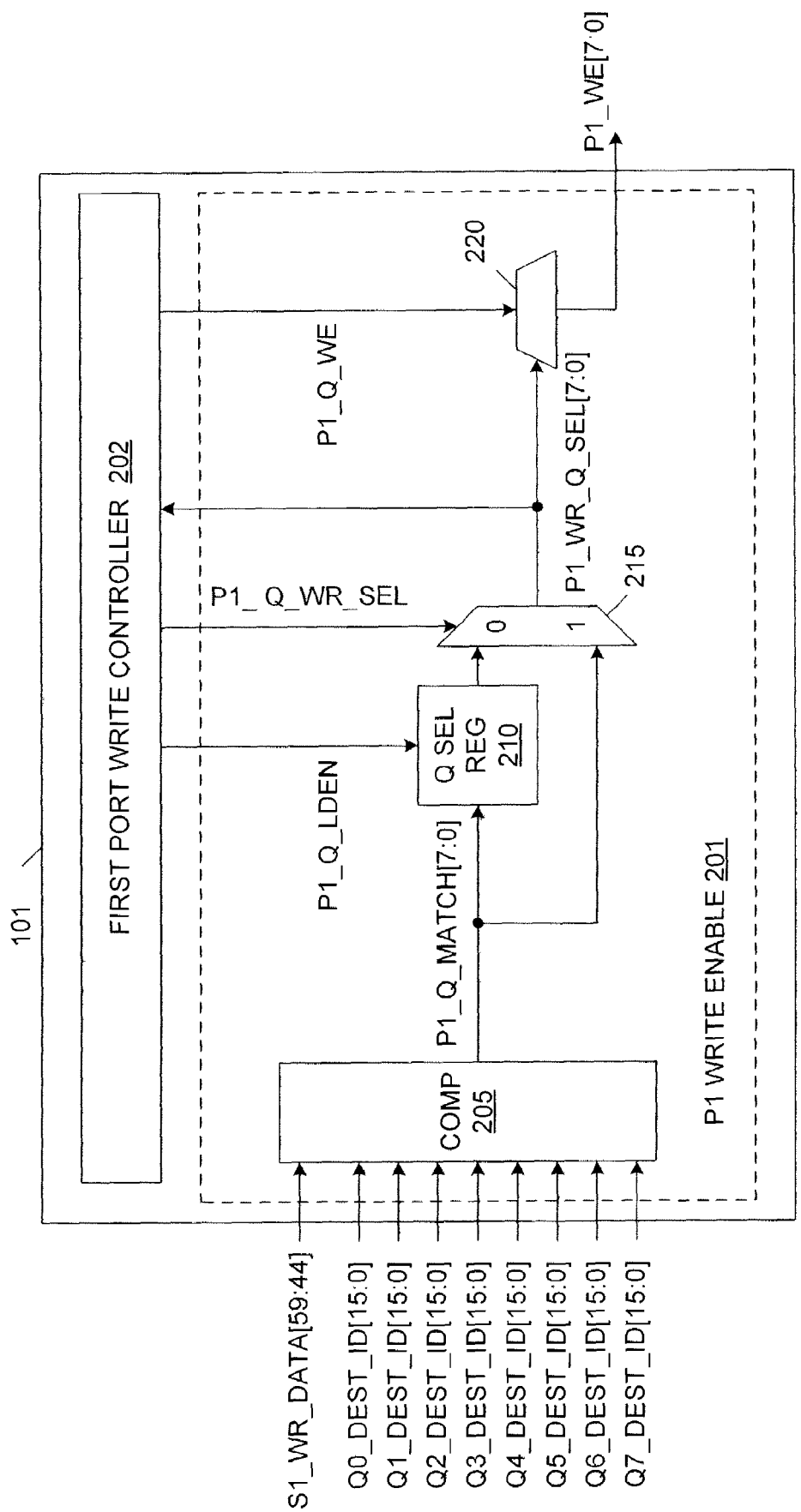
FIG. 2 is a block diagram of first port write block of the serial buffer of FIG. 1, in accordance with one embodiment of the present invention.

FIG. 2 is a block diagram of first port write block 101, which generates a set of first port write enable signals P1_WE[7:0] in accordance with one embodiment of the present invention. The second port write block 102 is substantially identical to the first port write block 101, and operates in the same manner as the first port write block 101 to generate the second port write enable signals P2_WE[7:0].

First port write block 101 includes first port write enable circuit 201 and first port write controller 202. First port write enable circuit 201 includes comparator 205, queue select register 210, multiplexer 215 and de-multiplexer 220.

Comparator 205 is coupled to receive the first port destination ID value S1_WR_DATA[59:44] and the queue destination ID values Q0_DEST_ID[15:0] to Q7_DEST_ID[15:0]. In response, comparator 205 provides first port queue match signals P1_Q_MATCH[7:0]. Comparator 205 activates the first port queue match signal P1_Q_MATCH[n] if the first port destination ID value S1_WR_DATA[59:44] matches the queue destination ID value Qn_DEST_ID[15:0], wherein in 'n' includes the integers from 0 through 7, inclusive. For example, comparator 205 will activate the P1_Q_MATCH[6] signal to a logic '1' state if the first port destination ID value S1_WR_DATA[59:44] matches the queue destination ID value Q6_DEST_ID[15:0]. Comparator 205 deactivates the first port queue match signal P1_Q_MATCH[n] to a logic '0' state if the first port destination ID value S1_WR_DATA[59:44] does not match the queue destination ID value Qn_DEST_ID[15:0].

It is important to note that the first port destination ID value S1_WR_DATA[59:44] should be selected to specify only queue destination ID values that are associated with queues assigned to the first port 1 by write configuration bits CFG_QIN[7:0]. Similarly, the second port destination ID value S2_WR_DATA[59:44] should be selected to specify only queue destination ID values that are associated with queues assigned to the second port by write configuration bits CFG_QIN[7:0]. System software can identify error conditions if the first and second port destination ID values S1_WR_DATA[59:44] and S2_WR_DATA[59:44] fail to meet these restrictions.

In accordance with one embodiment of the present invention, more than one of the queue destination ID values Q0_DEST_ID[15:0] to Q7_DEST_ID[15:0] assigned to the same port can be selected to have the same value. In this case, more than one of the P1_Q_MATCH[7:0] signals may be activated in response to a single first port destination ID value S1_WR_DATA[59:44]. As will become apparent in view of the subsequent disclosure, the simultaneous activation of multiple P1_Q_MATCH[7:0] signals enables multiple queues to be written from the first port 1 at the same time. Similar circuitry in second port write block 102 enables multiple queues to be simultaneously written from the second port 2. Simultaneously writing to multiple queues can improve system performance and optimize bus bandwidth utilization.

The first port queue match signals P1_Q_MATCH[7:0] are latched into queue select register 210 in response to a load enable signal (P1_Q_LDEN) provided by first port write controller 202. Multiplexer 215 is coupled to receive the latched and non-latched versions of the first port queue match signals P1_Q_MATCH[7:0]. Multiplexer 215 routes one of these versions as the first port write queue select signals P1_WR_Q_SEL[7:0] in response to a multiplexer control signal (P1_Q_WR_SEL) provided by first port write controller 202.

The first port write queue select signals P1_WR_Q_SEL[7:0] routed by multiplexer 215 are used to control de-multiplexer 220. De-multiplexer 220 selectively routes a first port queue write enable signal P1_Q_WE provided by first port write controller 202 to create the first port queue write enable signals P1_WE[7:0]. More specifically, for each first port write queue select signal P1_WR_Q_SEL[n] that is activated to a logic '1' state, de-multiplexer 220 routes the first port queue write enable signal P1_Q_WE provided by first port write controller 202 as the corresponding first port queue write enable signal P1_WE[n]. For each first port write queue select signal P1_WR_Q_SEL[n] that is de-activated to a logic '0' state, de-multiplexer 220 provides a logic '0' value as the corresponding first port queue write enable signal P1_WE[n].

As described in more detail below, the first port queue write enable signals P1_WE[7:0] identify each of the queues to be written in response to write requests received from the first port 1.

Figure 3:
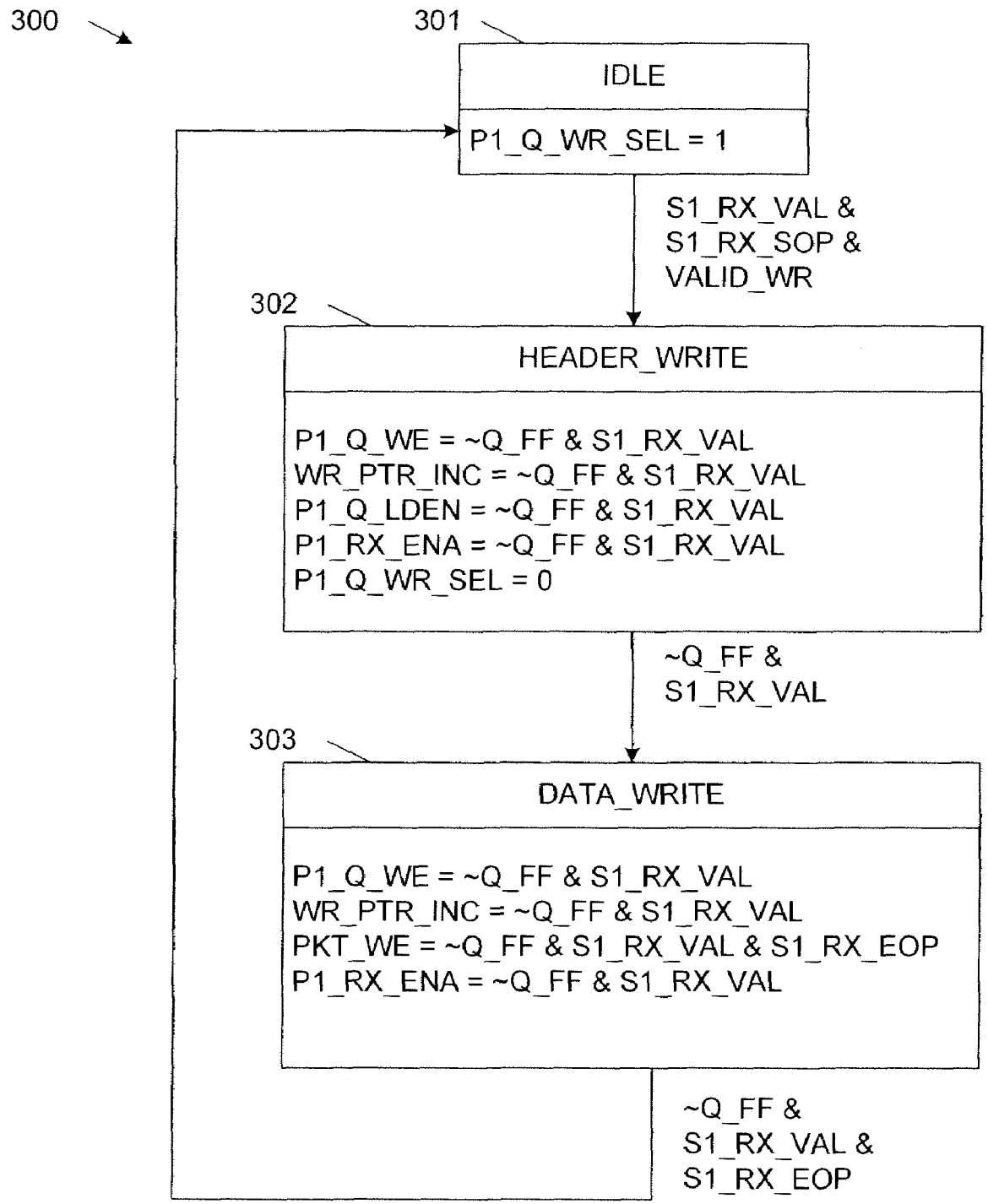
FIG. 3 is a flow diagram illustrating the manner in which a first port write controller of the first port write block of FIG. 2 operates in accordance with one embodiment of the present invention.

FIG. 3 is a flow diagram 300 illustrating the manner in which first port write controller 202 operates in accordance with one embodiment of the present invention.

First port write controller 202 is configured to receive the control information associated with the first port write request signals. This control information includes a start-of-packet identifier S1_RX_SOP, which is activated to confirm the start of a received packet, a valid packet identifier S1_RX_VAL, which is activated to confirm the validity of the received packet, and valid write identifier VALID_WR, which is activated to confirm the validity of an associated write request, and an end-of-packet identifier S1_RX_EOP, which is activated to confirm the end of a received packet. First port write controller is also configured to receive queue full flags Q_FF[7:0], which are activated to indicate that the corresponding queues Q7-Q0 are full.

Initially, first port write controller 202 begins operation in an IDLE state 301. In the IDLE state 301, first port write controller 202 activates the multiplexer control signal P1_Q_WR_SEL to a logic '1' state. In response, multiplexer 215 routes the unlatched first port write queue match signals P1_Q_MATCH[7:0] provided by comparator 205 as the first port write queue select signals P1_WR_Q_SEL[7:0]. At this time, the first port write queue select signals P1_WR_Q_SEL[7:0] identify the queue (or queues) to be written in response to a corresponding write request received on the first port 1. The queue(s) to be written are hereinafter referred to as the 'selected' first port write queue(s).

While in the IDLE state 301, first port write controller 202 monitors the received S1_RX_SOP, S1_RX_VAL, and VALID_WR control signals. Upon detecting that a packet is ready (S1_RX_SOP=S1_RX_VAL=1) and a valid write transaction has been requested (VALID_WR=1), processing proceeds to HEADER_WRITE state 302.

Within HEADER_WRITE state 302, first port write controller 202 identifies the selected first port write queue(s) by monitoring the first port write queue select signals P1_WR_Q_SEL[7:0] routed by multiplexer 215. First port write controller 202 then determines whether any of the selected first port write queue(s) is full, by checking the corresponding queue full flags Q_FF[7:0]. Upon determining that none of the one or more selected first port write queue(s) is full (~Q_FF=1) and the received packet is still valid (S1_RX_VAL=1), first port write controller 202 performs the following operations.

First port write controller 202 activates the first port queue write enable signal P1_Q_WE to a logic '1' state, such that first port queue write enable signal(s) P1_WE[7:0] associated with the one or more selected first port write queue(s) are activated. As described above, de-multiplexer 220 causes the first port queue write enable signals P1_WE[7:0] to correspond with the first port queue select signals P1_WR_Q_SEL[7:0] when the first port queue write enable signal P1_Q_WE is activated.

The activated first port queue write enable signals P1_WE[7:0] are passed through logical OR circuit 115 (FIG. 1), thereby activating the corresponding write queue enable signals Q_WE[7:0]. In response, the write packet header (i.e., S1_WR_DATA[63:0]) provided on the first port 1 is written to each of the one or more selected first port write queue(s).

In addition, first port write controller 202 activates a write pointer increment signal (WR_PTR_INC=~Q_FF & S1_RX_VAL=1) associated with each of the one or more selected first port write queue(s), thereby incrementing a write pointer associated with each of the one or more selected first port write queue(s).

First port write controller 202 also activates the P1_Q_LDEN signal (P1_Q_LDEN=~Q_FF & SL_RX_VAL=1), thereby causing the P1_Q_MATCH[7:0] signals provided by comparator 205 to be latched into queue select register 210.

In addition, first port write controller 202 de-activates the P1_Q_WR_SEL signal (P1_Q_WR_SEL=0), thereby causing the latched P1_Q_MATCH[7:0] signal provided by queue select register 210 to be routed by multiplexer 215.

First port write controller 202 also activates a first port receive enable signal (P1_RX_ENA=~Q_FF & S1_RX_VAL=1), which enables the packet data cycle to start.

Processing proceeds from HEADER_WRITE state 302 to DATA_WRITE state 303 upon detecting that none of the one or more selected first port write queues is full (~Q_FF=1) and the received packet is still valid (S1_RX_VAL=1).

Within DATA_WRITE state 303, the packet data cycle is implemented as follows. First port write controller 202 continues to activate the P1_Q_WE signal, the write pointer increment signal(s) WR_PTR_INC, and the first port receive enable signal P1_RX_ENA, as long as none of the one or more selected first port write queue(s) becomes full (~Q_FF=1) and the received packet remains valid (S1_RX_VAL=1). As a result, write packet data (i.e., S1_WR_DATA[63:0]) provided on the first port 1 is written to each of the one or more selected first port write queue(s).

Upon detecting the end of the packet data (S1_RX_EOP=1), first port write controller 202 asserts a first port packet write enable signal (PKT_WE=~Q_FF & S1_RX_VAL & S1_RX_EOP=1), that increments the water level associated with each of the one or more selected first port write queue(s). At this time (i.e., when ~Q_FF & S1_RX_VAL & S1_RX_EOP=1), processing returns to IDLE state 301.

Returning now to FIG. 1, the second port write block 102 operates in the same manner as the first port write block 101 to generate write enable signals P2_WE[7:0], which identify one or more queues to be written in response to each write request received on the second port 2. More specifically, the second port write block 102 activates the write enable signals P2_WE[7:0] associated with the queues to be written in response to a write request received on the second port 2.

Logical OR circuit 115 performs a bitwise logical OR operation on the first port write enable signals P1_WE[7:0] provided by the first port write block 101 and the second port write enable signals P2_WE[7:0] provided by the second port write block 102 to create the write enable signals Q_WE[7:0]. As a result, write operations initiated from the first port 1 can be performed at the same time as write operations initiated from the second port 2. Note that in accordance with the described embodiments, write operations initiated from the first port 1 will always access different queues than write operations initiated from the second port 2, such that no write conflicts exist between the two ports.

Read accesses of queues Q0-Q7 in accordance with one embodiment of the present invention will now be described.

First port read block 103 controls read accesses to queues Q0-Q3 by controlling queue read enable signals RE[3:0] and queue read select signals RD_Q_SEL[3:0]. Queue read enable signals RE[3:0] are activated to enable data to be read from queues Q3-Q0, respectively. Queue read select signals RD_Q_SEL[3:0] are activated to cause read multiplexer 131 to route data read from queues Q3-Q0, respectively. Similarly, second port read block 104 controls read accesses to queues Q7-Q4 by controlling queue read enable signals RE[7:4] and queue read select signals RD_Q_SEL[7:4]. Queue read enable signals RE[7:4] are activated to enable data to be read from queues Q7-Q4, respectively. Queue read select signals RD_Q_SEL[7:4] are activated to cause read multiplexer 132 to route data read from queues Q7-Q4, respectively.

The first port 1 initiates a read operation to a selected one of queues Q0-Q3 by providing a priority packet P1_PRI_WR_DATA[63:0] identifying a slave read request to the first port read block 103. Similarly, the second port 2 initiates a read operation to a selected one of queues Q4-Q7 by providing a priority packet P2_PRI_WR_DATA[63:0] that identifies a slave read request to the second port read block 104.

In the described embodiments, priority packet bits P1_PRI_WR_DATA[63:60] are encoded to identify a 'type' of the corresponding priority packet. In the described examples, a slave read (i.e., NREAD) request is specified on the first port 1 when the priority packet bits P1_PRI_WR_DATA[63:60] have a specified value of '0010'. A slave read request is similarly specified on the second port 2 when the priority packet bits P2_PRI_WR_DATA[63:60] have a specified value of '0010'.

In the described embodiments, if priority packet P1_PRI_WR_DATA[63:0] is a slave read request, then priority packet bits P1_PRI_WR_DATA[47:32] represent a read destination ID value of an associated slave read request on the first port 1. Similarly, if priority packet P2_PRI_WR_DATA[63:0] is a slave read request, then priority packet bits P2_PRI_WR_DATA[47:32] represent a read destination ID value of an associated slave read request on the second port 2. As described in more detail below, these read destination ID values are used to generate read enable signals RE[7:0] to queues Q7-Q0.

Figure 4:
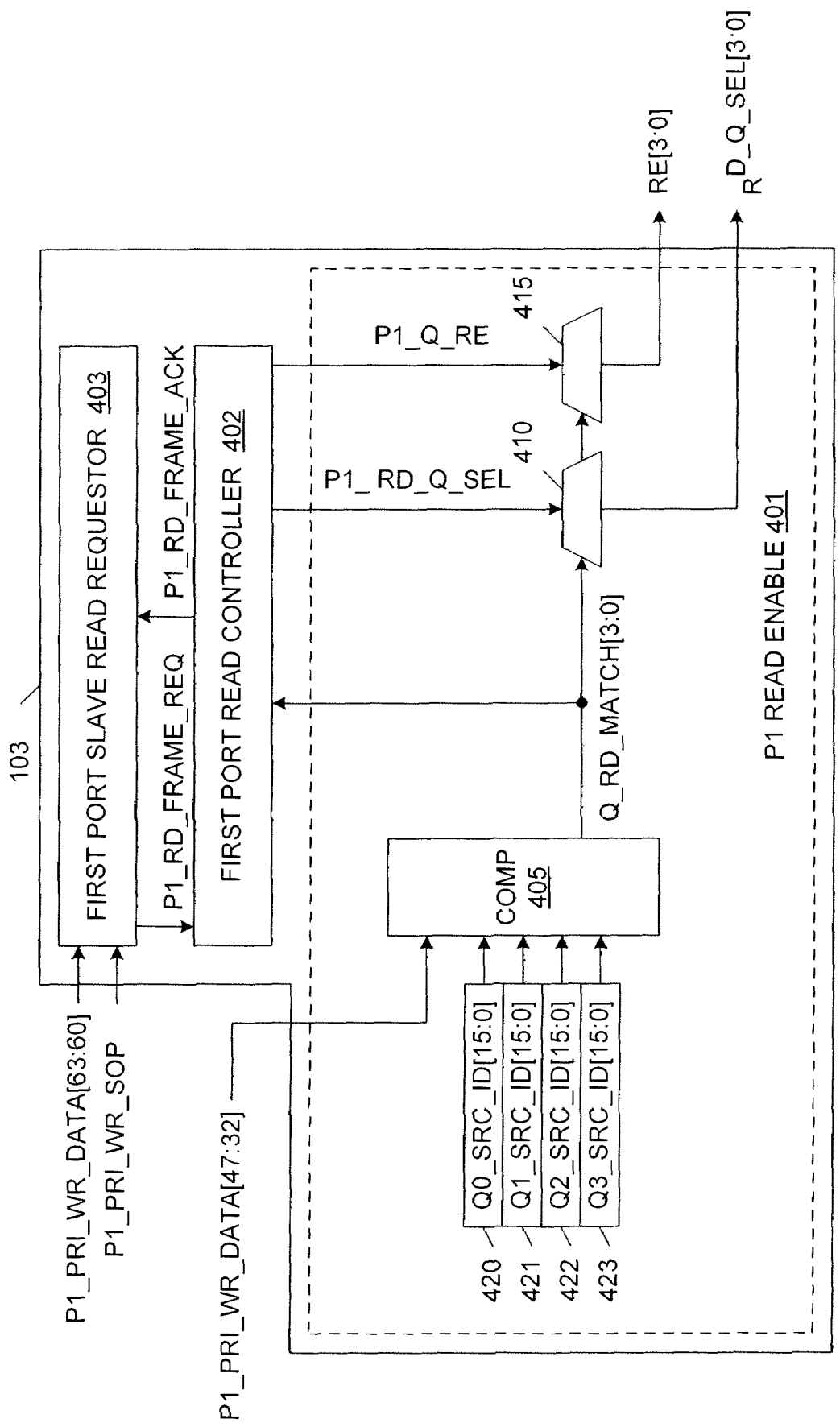
FIG. 4 is a block diagram of first port read block of the serial buffer of FIG. 1, in accordance with one embodiment of the present invention.

FIG. 4 is a block diagram of first port read block 103, which generates a set of first port read enable signals RE[3:0] in accordance with one embodiment of the present invention. The second port read block 104 is substantially identical to the first port read block 103, and operates in the same manner as the first port read block 103 to generate the second port read enable signals RE[7:4].

First port read block 103 includes first port read enable block 401, first port read controller 402 and first port slave read requestor 403. First port write enable block 401 includes comparator 405, de-multiplexers 410 and 415 and source ID registers 420-423.

Each of the source ID registers 420-423 stores a unique corresponding source ID value, which is assigned to queues Q0-Q3 for read purposes. More specifically, source ID registers 420, 421, 422 and 423 store respective source ID values Q0_SRC_ID[15:0], Q1_SRC_ID[15:0], Q2_SRC_ID[15:0] and Q3_SRC_ID[15:0], which correspond with queues Q0, Q1, Q2 and Q3, respectively. Note that second port read block 104 includes similar source ID registers, which store source ID values Q4_SRC_ID[15:0], Q5_SRC_ID[15:0], Q6_SRC_ID[15:0] and Q7_SRC_ID[15:0] corresponding with queues Q4, Q5, Q6 and Q7.

Comparator 405 is coupled to receive the first port read destination ID value P1_PRI_WR_DATA[47:32] and the source ID values Q0_SRC_ID[15:0] to Q3_SRC_ID[15:0]. In response, comparator 405 provides first port read queue match signals Q_RD_MATCH[3:0]. More specifically, comparator 405 will activate the first port read queue match signal Q_RD_MATCH[n] if the first port read destination ID value P1_PRI_WR_DATA[47:32] matches the corresponding queue source ID value Qn_DEST_ID[15:0], wherein 'n' represents the integers from 0 through 3, inclusive. For example, comparator 405 will activate the Q_RD_MATCH[2] signal to a logic '1' state if the first port read destination ID value P1_PRI_WR_DATA[47:32] matches the source ID value Q2_SRC_ID[15:0]. Comparator 405 deactivates the first port read queue match signal Q_RD_MATCH[n] to a logic '0' state if the first port read destination ID value P1_PRI_WR_DATA[47:32] does not match the corresponding source ID value Qn_SRC_ID[15:0]. In this manner, the first port read queue match signals Q_RD_MATCH[3:0] specify which one of queues Q0-Q3 should be read in response to a read request received on the first port 1. A queue specified in this manner is hereinafter referred to as the 'selected' first port read queue.

Note that second port read block 104 includes a comparator (not shown) similar to comparator 405, which generates second port read queue match signals Q_RD_MATCH[7:4] in response to the second port read destination ID value P2_PRI_WR_DATA[47:32] and the source ID values Q4_SRC_ID[15:0], Q5_SRC_ID[15:0], Q6_SRC_ID[15:0] and Q7_SRC_ID[15:0].

In accordance with the described embodiments, only one of the Q_RD_MATCH[3:0] signals may be activated in response to any particular first port read destination ID value P1_PRI_WR_DATA[47:32] (i.e., there can only be one selected read queue associated with the first port at any given time). Similarly, only one of the Q_RD_MATCH[7:4] signals may be activated in response to any particular second port read destination ID value P2_PRI_WR_DATA[47:32] (i.e., there can only be one selected read queue associated with the second port at any given time). However, one of the Q_RD_MATCH[3:0] signals may be activated at the same time that one of the Q_RD_MATCH[7:4] signals is activated. As will become apparent in view of the subsequent disclosure, this allows data to be read from one of queues Q0-Q3 to port 1 at the same time that data is read from one of the queues Q7-Q4 to port 2.

The first port read queue match signals Q_RD_MATCH[3:0] provided by comparator 405 are used to control de-multiplexers 410 and 415. De-multiplexer 410 selectively routes a first port queue read select signal P1_RD_Q_SEL provided by first port read controller 402 to create the first port queue read select signals RD_Q_SEL[3:0]. More specifically, if a first port read queue match signal Q_RD_MATCH[n] is activated to a logic '1' state, de-multiplexer 410 will route the first port read queue select signal P1_RD_Q_SEL as the corresponding first port read queue select signal RD_Q_SEL[n]. Conversely, if a first port read queue match signal Q_RD_MATCH[n] is de-activated to a logic '0' state, de-multi-plexer 410 will provide a logic '0' value as the corresponding first port read queue select signal RD_Q_SEL[n]. A similar de-multiplexer (not shown) in second read block 104 generates second port read queue select signals RD_Q_SEL[7:4] in a similar manner.

De-multiplexer 415 selectively routes a first port read enable signal P1_Q_RE provided by the first port read controller 402 to create the first port queue enable signals RE[3:0]. More specifically, is a first port read queue match signal Q_RD_MATCH[n] is activated to a logic '1' state, de-multiplexer 415 will route the first port read enable signal P1_Q_RE as the corresponding first port queue read enable signal RE[n]. Conversely, if a first port read queue match signal Q_RD_MATCH[n] is de-activated to a logic '0' state, de-multiplexer 415 will provide a logic '0' value as the corresponding first port queue read enable signal RE[n]. A similar de-multiplexer (not shown) in second read block 104 generates second port queue read enable signals RE[7:4] in a similar manner.

Figure 5:
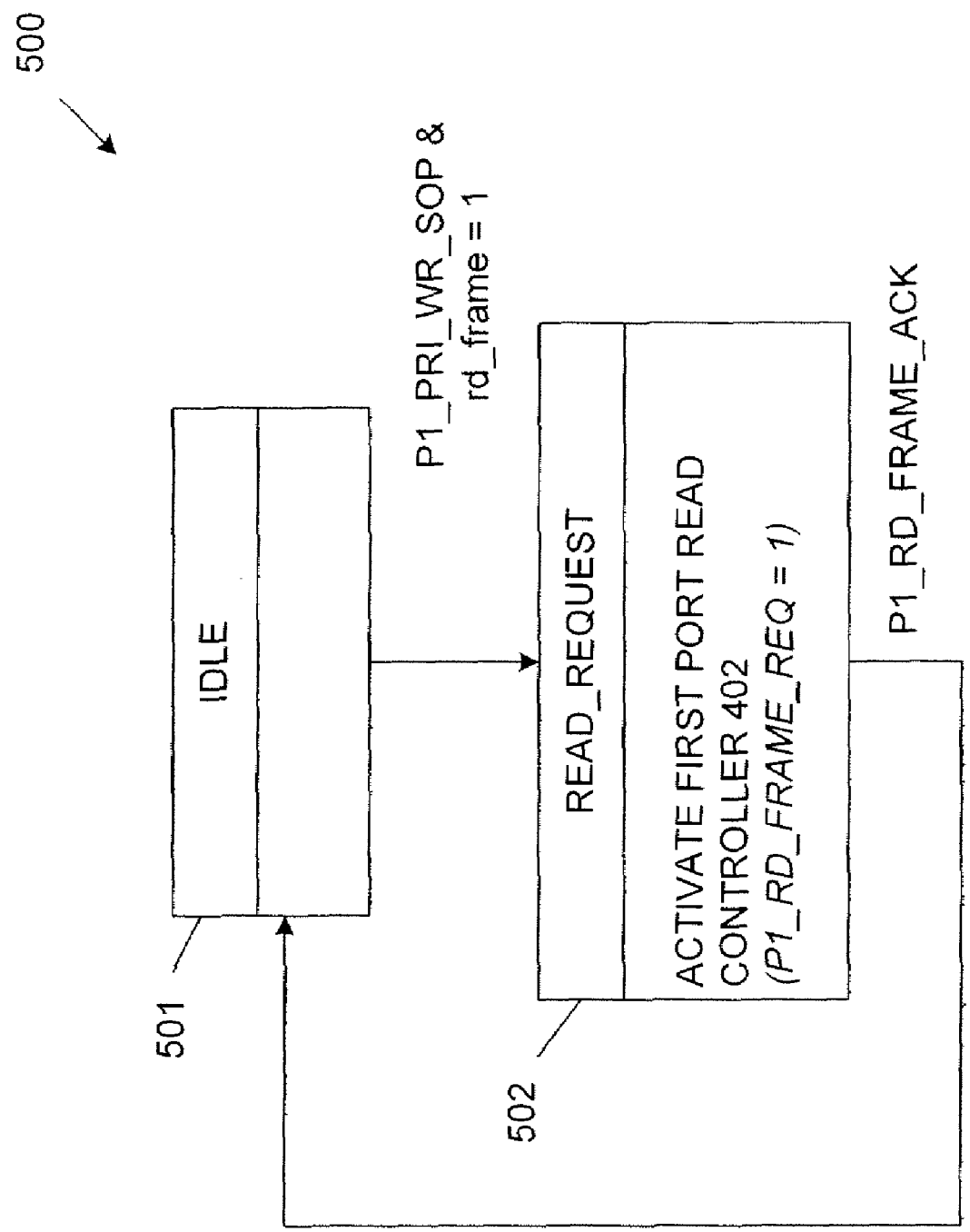
FIG. 5 is a flow diagram illustrating the manner in which a first port slave read requestor of the first port read block of FIG. 4 operates in accordance with one embodiment of the present invention.

FIG. 5 is a flow diagram 500 illustrating the manner in which first port slave read requestor 403 operates in accordance with one embodiment of the present invention.

First port slave read requester 403 is initially in an IDLE state 501. First port slave read requestor 403 receives the priority packet bits P1_PRI_WR_DATA[63:60] from the first port 1. Upon detecting that the priority packet bits identify a slave read request (i.e., P1_PRI_WR_DATA[63:60]= '0010'), first port slave read requestor 403 activates a read frame control signal (rd_frame=1). First port slave read requestor 403 also receives a priority packet start of frame indicator signal P1_PRI_WR_SOP, which is activated (P1_PRI_WR_SOP=1) when the start of a priority packet is detected.

Upon detecting that the priority packet bits received from the first port 1 identify a slave read request (rd_frame=1) and also detecting that the priority packet start of frame indicator signal P1_PRI_WR_SOP has been activated, first port slave read requestor 403 transitions from IDLE state 501 to READ_REQUEST state 502. In READ_REQUEST state 502, first port slave read requestor 403 activates a first port read frame request signal (P1_RD_FRAME_REQ=1), which is provided to first port read controller 402. First port slave read requestor 403 remains in READ_REQUEST state 502 until first port read controller 402 activates a first port read frame acknowledge signal (P1_RD_FRAME_ACK) to indicate that all of the requested data packets have been read from the selected first port read queue. When the first port read controller 402 activates the first port read frame acknowledge signal (P1_RD_FRAME_ACK=1), the first port slave read requestor 403 returns to IDLE state 501.

Figure 6:
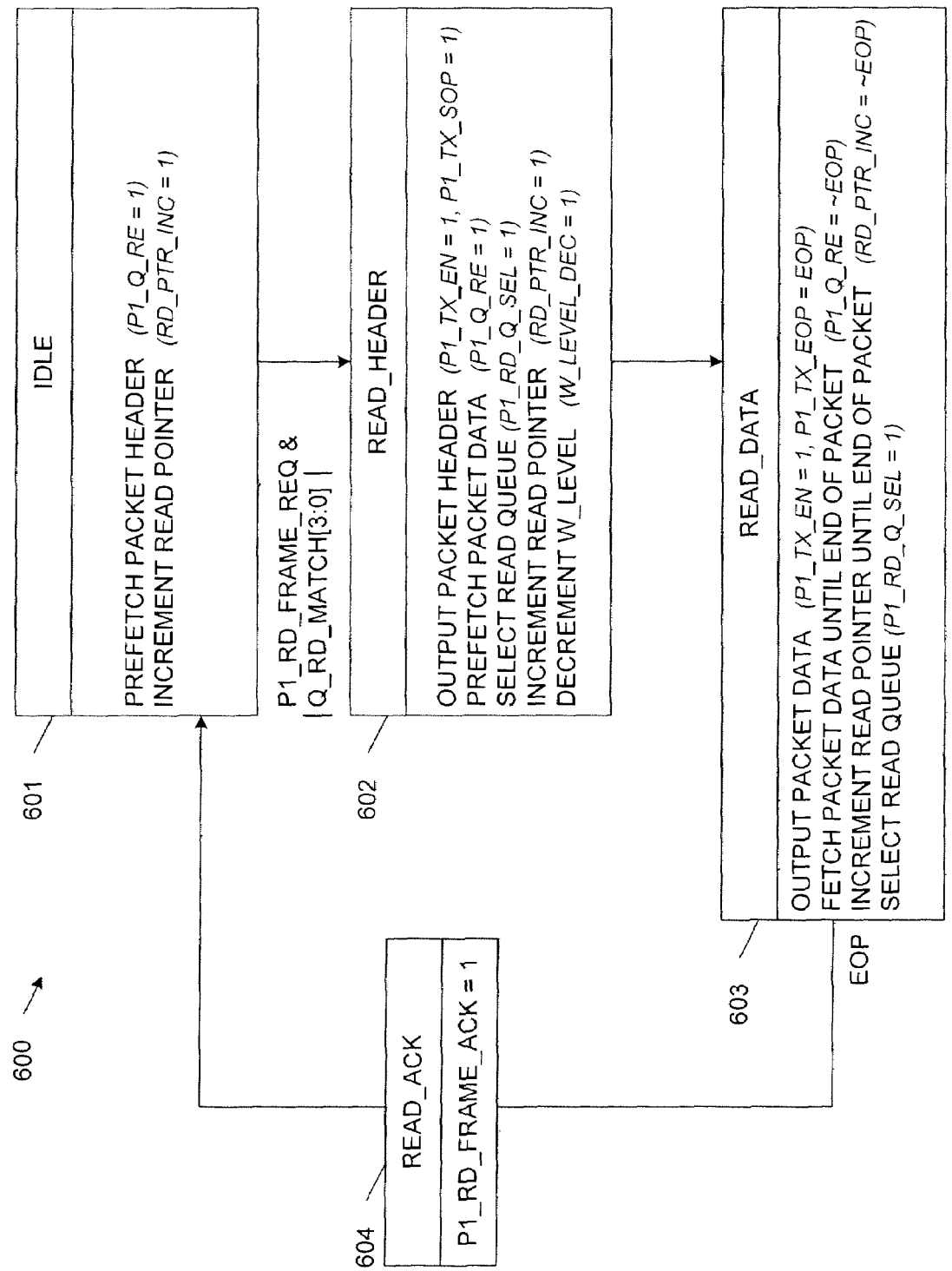
FIG. 6 is a flow diagram illustrating a read control process implemented by a first port read controller of the first port read block of FIG. 4, in accordance with one embodiment of the present invention.

FIG. 6 is a flow diagram 600 illustrating a read control process implemented by first port read controller 402 in accordance with one embodiment of the present invention. Initially, first port read controller 402 begins operation in an IDLE state 601. While in the IDLE state 601, first port read controller 402 asserts the first port queue read enable signal P1_Q_RE, thereby enabling any activated first port queue read match signal Q_RD_MATCH[3:0] to activate a corresponding read enable signal RE[3:0], thereby causing a packet header to be read (pre-fetched) from the associated queue (i.e., the selected first port read queue). Note that the read pointer of each queue is initially set to access the packet header of a first data packet stored in the queue. Also within IDLE state 601, first port read controller 402 increments the read pointer of the selected first port read queue by activating an associated read counter increment signal (RD_P-

TR_INC=1). At this time, the read pointer points to the first data value of the first data packet in the selected first port read queue.

While in the IDLE state 601, queue first port read controller 402 monitors the P1_RD_FRAME_REQ signal provided by first port slave read requestor 403 and the Q_RD_MATCH[3:0] signals provided by comparator 405. Upon detecting that the P1_RD_FRAME_REQ signal has been activated and that one of the first port read queue match signals Q_RD_MATCH [3:0] is activated, processing will proceed to READ_HEADER state 602.

Processing will then proceed as described below, as long as the selected first port read queue has a higher priority than any other queue presently scheduled to be serviced.

Within READ_HEADER state 602, first port read control 402 activates the first port queue read select signal P1_RD_Q_SEL, which causes de-multiplexer 410 to activate the read queue select signal RD_Q_SEL[3:0] associated with the selected first port read queue. In response, the packet header retrieved from the selected first port read queue during the IDLE state 601 is routed through read multiplexer 131 to the first port 1. First port read controller 402 also enables a first port transmit enable signal (P1_TX_EN=1) and activates a first port start-of-packet transmit signal (P1_TX_SOP=1), thereby enabling the packet header to be transmitted from the first port 1 to the requesting device.

Also in the READ_HEADER state 602, first port read controller 402 continues to assert the first port queue read enable signal (P1_Q_RE=1), thereby causing the first data value of the first data packet to be read (pre-fetched) from the selected first port read queue. After this first data value has been pre-fetched, first port read controller 402 increments the read pointer of the selected first port read queue (RD_PTR_INC=1), such that this read pointer points to the second data value of the first data packet.

Also in the READ_HEADER state 602, first port read controller 402 decrements a water level value (WLEVEL) associated with the selected first port read queue by activating a corresponding water level decrement signal (WLEVEL_DEC=1).

Processing then proceeds from READ_HEADER state 602 to READ_DATA state 603. Within READ_DATA state 603, first port read controller 402 continues to activate the first port transmit enable signal (P1_TX_EN=1), thereby causing the first data value pre-fetched in the READ_HEADER state 602 to be transmitted from the first port 1. In addition, first port read controller 402 extracts an end-of-packet identifier (EOP) from the first data value. This end-of-packet identifier is de-activated (EOP=0) if the first data value is not the last data value of the associated data packet. Conversely, this end-of-packet identifier is activated (EOP=1) if the first data value is the last data value of the associated data packet. A first port transmit end-of-packet signal is set equal to the end of packet identifier (P1_TX_EOP=EOP). The first port queue read enable signal P1_Q_RE and the read pointer increment signal RD_PTR_INC associated with the selected first port read queue are each set equal to the inverse of the end of packet identifier (P1_Q_RE=RD_PTR_INC=~EOP).

If the first data value is not the last data value of the associated packet (EOP=0), the first port read enable signal P1_Q_RE remains activated, thereby causing the next (i.e., second) data value to be read from the selected first port read queue (i.e., from the location identified by the previously incremented read pointer). In addition, the read pointer increment signal RD_PTR_INC associated with the selected first port read queue remains activated, thereby incrementing the read pointer of the selected first port read queue to point to the next (i.e., third) data value of the first data packet.

Also in the READ_DATA state 603, first port read controller 402 continues to activate the first port queue read select signal P1_RD_Q_SEL, thereby ensuring that the data values read from the selected first port read queue are routed through read multiplexer 131 to the first port 1.

The above-described steps of the READ_DATA state 603 are repeated, thereby sequentially reading data values of the first data packet from the selected first port read queue and incrementing the associated read pointer, until the end-of-packet identifier of the data value transmitted from the first port 1 identifies the end of the first data packet (i.e., EOP=1). At this time, first port read controller 402 deactivates the first port queue read enable signal (P1_Q_RE=~EOP=0), such that no additional data values are pre-fetched from the selected first port read queue. In addition the read pointer increment signal associated with the selected first port read queue is de-asserted (RD_PTR_INC=~EOP=0), such that the associated read pointer will point to the packet header of the next data packet stored in the selected first port read queue.

Upon detecting the activated end-of-packet identifier, first port read controller 402 also causes processing to proceed from READ_DATA state 603 to READ_ACK state 604. In READ_ACK state 604, first port read controller 402 activates the first port read frame acknowledge signal (P1_RD_FRAME_ACK=1) to indicate that the read access of the selected first port read queue is complete. The activated first port read frame acknowledge signal is provided to first port slave read requestor 403, thereby causing the first port slave read requestor 403 to return to an IDLE state 501 (FIG. 5). Upon activating the first port read frame acknowledge signal, first port read controller 402 returns to IDLE state 601 (FIG. 6).

In accordance with one embodiment of the present invention, while in IDLE state 601, first port read controller 402 may determine that the selected first port read queue is empty. In this case, first port read controller 402 may cause processing to proceed directly from IDLE state 601 to READ_ACK state 604, thereby causing the first port read frame acknowledge signal to be activated (P1_RD_FRAME_ACK=1) without transmitting any read data from the first port 1. Upon detecting these conditions, serial buffer 101 may generate a 'read exceed' packet, which is transmitted to the requesting device via the first port 1 to indicate that the corresponding read request attempted to access an empty queue.

Although the present invention has been described in connection with various embodiments, it is understood that variations of these embodiments would be obvious to one of ordinary skill in the art. Thus, the present invention is limited only by the following claims.

We claim:

1. A serial buffer comprising:
   a first serial port;
   a second serial port;
   a plurality of queues;
   a first write block configured to perform write operations associated with the first serial port by accessing a first programmable set of the plurality of queues;
   a second write block configured to perform write operations associated with the second serial port by accessing a second programmable set of the plurality of queues, wherein the first programmable set and the second programmable set are mutually exclusive;
   a first read block configured to perform read operations associated with the first serial port by accessing a first predetermined set of the plurality of queues; and a second read block configured to perform read operations associated with the second serial port by accessing a second predetermined set of the plurality of queues.

2. The serial buffer of claim 1, wherein the first programmable set of the plurality of queues is selected to be the same as the first predetermined set of the plurality of queues.

3. The serial buffer of claim 2, wherein the second programmable set of the plurality of queues is selected to be the same as the second predetermined set of the plurality of queues.

4. The serial buffer of claim 1, wherein the first programmable set of the plurality of queues is selected to be the same as the second predetermined set of the plurality of queues.

5. The serial buffer of claim 4, wherein the second programmable set of the plurality of queues is selected to be the same as the first predetermined set of the plurality of queues.

6. The serial buffer of claim 4, wherein the first serial port is configured to implement a first serial buffer protocol and the second serial port is also configured to implement the first serial buffer protocol.

7. The serial buffer of claim 4, wherein the first serial port is configured to implement a first serial buffer protocol and the second serial port is also configured to implement a second serial buffer protocol, different than the first serial buffer protocol.

8. The serial buffer of claim 1, wherein the first serial port is configured to implement a first serial buffer protocol and the second serial port is also configured to implement the first serial buffer protocol.

9. The serial buffer of claim 1, wherein the first serial port is configured to implement a first serial buffer protocol and the second serial port is also configured to implement a second serial buffer protocol, different than the first serial buffer protocol.

10. The serial buffer of claim 1, wherein the first write block is configured to perform write operations in parallel with the second write block.

11. The serial buffer of claim 1, wherein the first read block is configured to perform read operations in parallel with the second read block.

12. The serial buffer of claim 1, wherein the first write block comprises means for performing a write operation associated with the first serial port by simultaneously accessing a plurality of queues in the first programmable set.

13. The serial buffer of claim 12, wherein the second write block comprises means for performing a write operation associated with the second serial port by simultaneously accessing a plurality of queues in the second programmable set.

14. The serial buffer of claim 1, wherein the first write block is configured to perform write operations in parallel with read operations performed by the first read block.

15. The serial buffer of claim 14, wherein the second write block is configured to perform write operations in parallel with read operations performed by the second read block.

16. The serial buffer of claim 1, further comprising a configuration register for storing a plurality of configuration bits, wherein each of the configuration bits is associated with a corresponding one of the queues, and determines whether the corresponding one of the queues is in the first programmable set of queues or the second programmable set of queues.

17. The serial buffer of claim 1, wherein the first write block is configured to perform write operations to a first one of the queues in parallel with read operations performed by the second read block from the first one of the queues.

18. The serial buffer of claim 17, wherein the second write block is configured to perform write operations to a second one of the queues in parallel with read operations performed by the first read block from the second one of the queues.

19. A method of operating a serial buffer comprising:
    selecting a first set of one or more queues from a plurality of queues to correspond with a first serial port of the serial buffer;
    selecting a second set of one or more queues from the plurality of queues to correspond with a second serial port of the serial buffer, wherein any of the plurality of queues can be selected to be in either the first set or the second set, and wherein the first set of one or more queues and the second set of one or more queues are mutually exclusive;
    performing write operations to the first set of one more queues in response to write requests received on the first serial port;
    performing write operations to the second set of one or more queues in response to write requests received on the second serial port;
    performing read operations from a first predetermined set of the plurality of queues in response to read requests received on the first serial port; and
    performing read operations from a second predetermined set of the plurality of queues in response to read requests received on the second serial port.

20. The method of claim 19, further comprising selecting the first set of one or more queues to be the same as the second predetermined set of the plurality of queues.

21. The method of claim 20, further comprising selecting the second set of one or more queues to be the same as the second predetermined set of the plurality of queues.

22. The method of claim 19, wherein the first serial port is configured to implement a first serial buffer protocol and the second serial port is also configured to implement a second serial buffer protocol, different than the first serial buffer protocol.

23. The method of claim 19, further comprising:
    performing write operations to the first set of one or more queues in parallel with write operations to the second set of one or more queues;
    performing read operations from the first predetermined set of the plurality of queues in parallel with read operations from the second predetermined set of the plurality of queues;
    performing write operations to the first set of one or more queues in parallel with read operations from the first predetermined set of the plurality of queues; and
    performing write operations to the second set of one or more queues in parallel with read operations from the second predetermined set of the plurality of queues.

* * * * *